INVENTOR
Richard Siegemund

United States Patent Office 3,454,728
Patented July 8, 1969

3,454,728
MAGNETIC HEAD HAVING POINT-WELDED LAMINATIONS AND METHOD OF PRODUCING THE SAME
Richard Siegemund, St. Georgen, Black Forest, Germany, assignor to Dual Gebruder Steidinger, St. Georgen, Black Forest, Germany, a corporation of Germany
Filed Jan. 28, 1966, Ser. No. 523,801
Claims priority, application Germany, Feb. 3, 1965, St 23,298
Int. Cl. G11b 5/00, 5/42, 5/30
U.S. Cl. 179—100.2     4 Claims

ABSTRACT OF THE DISCLOSURE

A magnetic head and method of producing the same, wherein the core consists of two laminated halves, each half comprising a plurality of laminations, and the laminations are spot welded together at at least one point, and the welded laminations are subsequently annealed.

---

The present invention relates to a magnetic head, the core of which comprises two laminated halves, the ribs of which are annealed after being stamped out.

In magnetic heads of this type it is conventional to powder the individual ribs, after being stamped out, with a magnesium powder. The powdering is required in order to prevent during the annealing operation an adhesion of the parts to each other. Thereafter, the individual ribs are carefully assembled to one core-half, always by pouring on an artificial resin or clamping together by means of particular pressure plates.

Such a procedure requires many steps and is rendered more difficult due to the fact that the primarily highly permeable rib material is very sensitive against mechanical jolts, since it changes thereby its permeability. Furthermore, the individual ribs are comparatively small and thin.

It is known from the design of electric machines to combine annealed iron packages at the end faces by means of welding. Such a procedure is, however, not suitable for the comparatively small and sensitive magnetic heads.

It is, therefore, one object of the present invention to provide a magnetic head, wherein the production of the particular magnetic cores is simplified such that the laminations of one core-half are joined together prior to the annealing step by means of electrical point-welding.

By such an arrangement the manipulation for the annealing process is appreciably simplified. The same applies also to the further working after the annealing step.

A deterioration of the magnetic characteristics due to the magnetic cross-connection, which results at the welding point, practically does not occur, since the cross-section of the welding point can be maintained very small and as experience showed, generally only one welding point is required.

For complicated core cross-sections it may be suitable to provide a second welding point.

With these and other objects in view which will become apparent in the following detailed description, the present invention will be clearly understood in connection with the accompanying drawing, in which.

Figure 1:
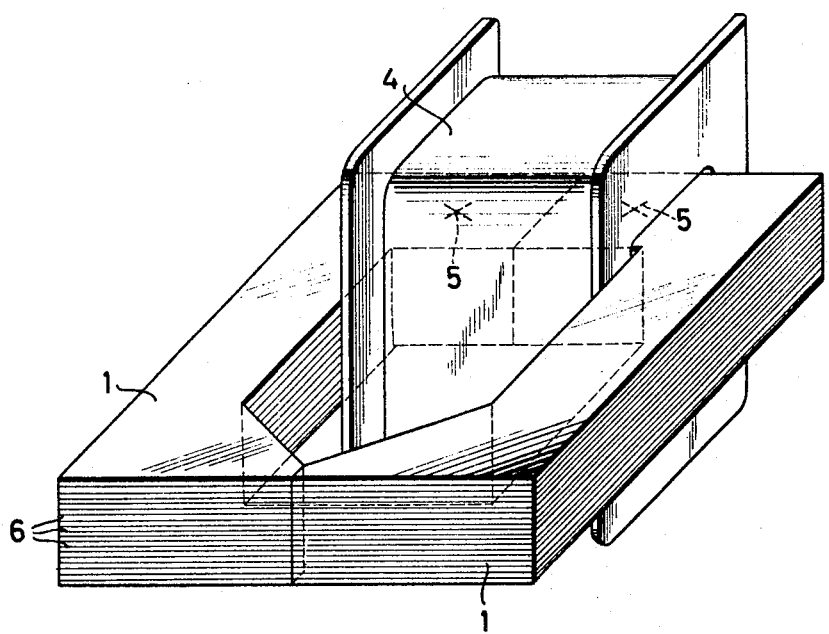
FIGURE 1 is a perspective top view of a magnetic head.

Referring now to the drawing and in particular to FIG. 1, the magnetic head comprises a core 1, which consists of two halves, which are joined together by means (not shown), whereby one half is shown broken up. The coil 4 is disposed on the core 1 in conventional arrangement. In each of the core-halves 1, the individual ribs 6 are joined together at welding points 5 by means of electrical point-welding prior to the annealing step.

Figure 2:
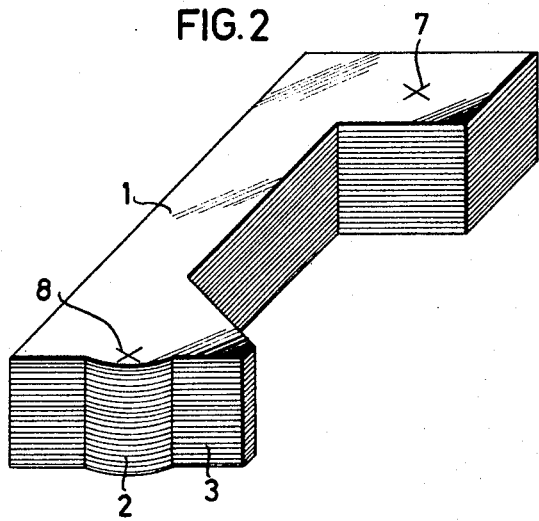
FIG. 2 is a perspective top view of a second embodiment of a core-half.

Referring now again to the drawing and in particular to FIG. 2, a second embodiment is disclosed in which each half of the core 1' is welded together at the welding points 7 and 8 by electrical point welding. The welding point 8 is disposed at an additionally provided projection 2, which is removed again during the overgrinding of the end face 3 of the magnetic head in the process of further working thereon, that means after pouring thereon an artificial resin.

While I have disclosed two embodiments of the present invention, it is to be understood that these embodiments are given by example only and not in a limiting sense, the scope of the present invention being determined by the claims.

I claim:
1. A magnetic head, comprising:
   a core consisting of two laminated halves, each half comprising a plurality of laminations,
   spot welding means for joining said laminations together by means of at least one point-weld, and
   said at least one point-welded laminations being annealed with said at least one point-weld.
2. A method of producing a magnetic head, comprising the steps of:
   stamping out laminations to form two core halves therefrom,
   joining together said stamped out laminations by electric point-welding, and
   annealing said core halves subsequent to said point-welding step.
3. A method of producing a magnetic head, comprising the steps of:
   stamping out laminations to form two core halves therefrom,
   joining together said stamped out lamination of each of said core halves at two point-weldings, annealing said core halves subsequent to said point-welding step, and
   removing one of said weld-points during the further finishing of said magnetic head.
4. The method, as set forth in claim 3, wherein:
   said one of said weld points is located adjacent a projection at the end face of said laminations, and said projections are removed in said removing step.

References Cited

UNITED STATES PATENTS

| 1,857,215 | 5/1932 | Ruder | 29—609 |
| 2,628,284 | 2/1953 | Friend | 179—100.2 |
| 2,660,622 | 11/1953 | Field et al. | 179—100.2 |

BERNARD KONICK, Primary Examiner.

J. P. MULLINS, Assistant Examiner.

U.S. Cl. X.R.

29—603, 609